United States Patent
Guichaoua et al.

[11] Patent Number: 5,868,932
[45] Date of Patent: Feb. 9, 1999

[54] FIBER WITH REUSABLE SHELL AND CENTER TUBE

[75] Inventors: Jean-Luc Guichaoua, Combrit; Denis Douchet, Fouesnant, both of France

[73] Assignee: Fleetguard, Inc., Nashville, Tenn.

[21] Appl. No.: 908,205

[22] Filed: Aug. 7, 1997

Related U.S. Application Data

[63] Continuation of Ser. No. 504,608, Jul. 20, 1996, abandoned.

[51] Int. Cl.⁶ .................................................. B01D 35/30
[52] U.S. Cl. ........................ 210/440; 210/442; 210/450; 210/457
[58] Field of Search .................................. 210/232, 440, 210/442–444, 450, 451, 455, 457, 458, 493.2

[56] References Cited

U.S. PATENT DOCUMENTS 5,374,355  12/1994  Habiger et al. ........................ 210/450
5,413,712   5/1995  Gewiss et al. ......................... 210/457
5,660,729   8/1997  Baumann ............................... 210/457

FOREIGN PATENT DOCUMENTS

4127031  2/1993  Germany .............................. 210/444
2258166  2/1993  United Kingdom .............. 123/196 A

*Primary Examiner*—Matthew O. Savage
*Attorney, Agent, or Firm*—Gary M. Gron

[57] ABSTRACT

A filter and filtering cartridge with a removable center tube, for the filtering of fluids. The invention relates to a filter for circulating fluid of the type consisting of a filtering cartridge inserted in an outer shell, with the outer shell being intended to be removably connected to a base. The outer shell cooperates with an independent and removable center tube. A filtering cartridge is mounted in the outer shell around the independent and removable center tube which extends longitudinally inside said outer shell over at least a substantial part of the length of the outer shell. The filtering cartridge is longitudinally restrained inside said outer shell in part by the removable center tube.

18 Claims, 6 Drawing Sheets

FIBER WITH REUSABLE SHELL AND CENTER TUBE

This application is a Continuation of Ser. No. 08/504,608, filed Jul. 20, 1996, now abandoned.

TECHNICAL FIELD

The present invention relates to filtration of a fluid, particularly oil, fuel, or coolant, circulating in an internal combustion engine, or in a hydraulic system.

More precisely, the invention relates to a filter of the type that includes an outer shell connected to a receiving component or filter head that is permanently connected with a fluid circulation engine system, for example, the lubrication system of an engine and to a removable filtering cartridge for filtering contaminants that is intended to be inserted in the outer shell and to be replaced after it has removed its rated quantity of contaminants.

BACKGROUND ART

Conventionally, the filtering cartridge is held or restrained in terms of longitudinal movement inside the outer shell at the one end with the filter head and at the other end by an end wall of the outer shell.

This type of filter operates in the following manner: The fluid to be filtered (for example, oil) is introduced through an intake opening of the filter head, to an annular chamber in the outer shell, flows along the internal wall of the outer shell, and passes radially inward through the filtering cartridge, which retains the contaminants (particularly particles of heavy metals) found in suspension in the fluid. The filtered fluid then passes through the central axis of the outer shell and leaves through an outlet opening of the head.

When the filtering cartridge placed in the outer shell reaches the end of its useable life, that is to say when the filtering cartridge no longer satisfactorily fulfills its role of filtration, an operator separates the outer shell from the filter head, removes the worn out filtering cartridge, replaces it with a new filtering cartridge, and reattaches the outer shell to the filter head. Used filtering cartridges are subsequently incinerated so as to destroy the organic polluting materials and to concentrate the inorganic polluting materials (particularly the heavy metals, such as lead).

This type of filter, however, offers several disadvantages. A first disadvantage lies in the fact that the used filtering cartridge cannot be completely incinerated because it generally contain certain metallic elements, particularly end plates and a central perforated interior tube. The elimination of this remaining waste is made more complicated at the expense of the environment.

Another disadvantage is connected with the longitudinal restraining of the filtering cartridge inside the outer shell. In effect, this restraining requires one to take into account precisely the relative positioning of the outer shell with respect to the filter head since the outer shell serves as a lower stop for one end of the filtering cartridge. In other words, the longitudinal play of the filtering cartridge in the outer shell depends on the dimensioning of the outer shell.

Finally, the shape of this type of filter is such that it has a certain number of interfaces or joints where fluid leakage could occur. It therefore requires the use of several seals.

DISCLOSURE OF THE INVENTION

A primary objective of the invention is to provide a filter for fluid of the type consisting of a filtering cartridge inserted in an outer shell that is intended to be connected on a receiving component that is solidly connected to a fluid circulation system, with it being possible to completely incinerate this filtering cartridge when it is used.

Another objective of the invention is to provide such a filter whose mounting is independent from the dimensioning of the outer shell as well as from the relative positioning of the outer shell and a filter head to which it is attached.

An additional objective of the invention is to provide such a filter that a reduced number of necessary components and a reduced weight.

These objectives as well as others that will appear in the following are achieved according to the invention by means of a fluid filter comprising an annular outer shell having an integral closed end and an open end and a filtering cartridge received in said shell, the cartridge having first and second annular end plates secured to an annular filtration medium, the first and second end plates having substantially aligned central openings.

A perforated center tube is removably secured to the outer shell, the filtering cartridge being mounted over the center tube at least partially through said aligned central openings, the filter cartridge being restrained in an axial direction, in part by said center tube, whereby after use only the filter cartridge is replaced.

SUMMARY OF THE DRAWINGS

FIG. 1A2 shows an alternative expanded view of the area A of FIG. 1;

BEST MODE FOR CARRYING OUT THE INVENTION

Figures 1, 1A, 1A, 1G:
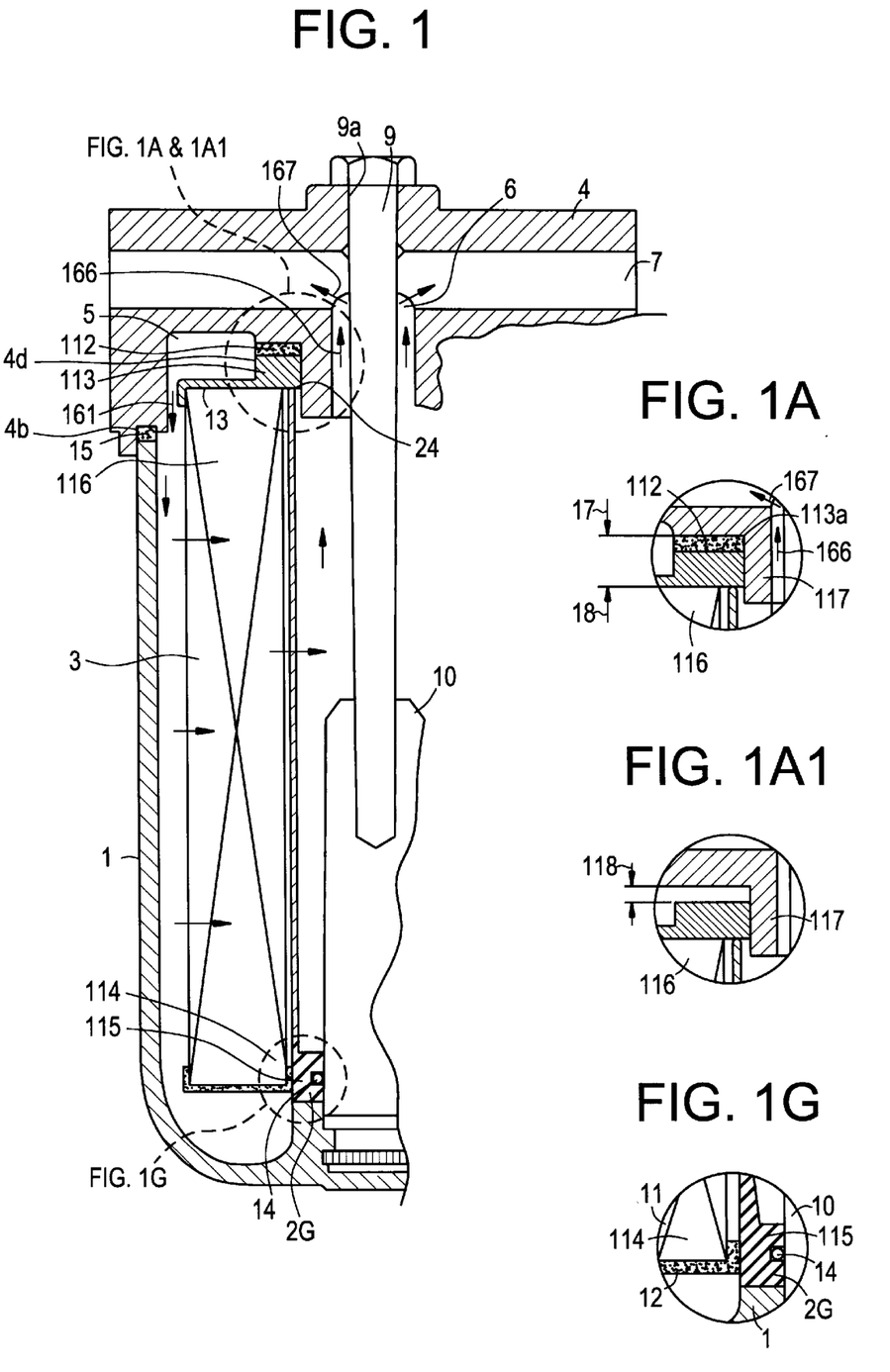
FIG. 1 shows a longitudinal section view of a first preferred embodiment of a fuel filter according to the present invention.
FIG. 1G, shows an expanded view of the area G of FIG. 1.
FIG. 1A shows an expanded view of the area A of FIG. 1.

Referring to FIG. 1, the fuel filter comprises a filter head 4 including a fluid intake opening (not shown) that opens into annular chamber 5 and a fluid outlet opening 7 for filtered fuel that communicates with central passage 6. Filter head 4 has a protrusion 117 around passage 6 receiving a filtering cartridge 3 retained in an outer shell 1. An annular seal 15 is generally placed between a shoulder 4b formed on filter head 4 and the open end of outer shell 1. Outer shell 1 is attached to filter head 4 by a threaded rod 9 which passes through an opening 9a in filter head 4, and is threaded into a stud 10 attached to the bottom 1a of outer shell 1.

A removable perforated center tube 2g comprises an end that opens into the annular interior of the filtering cartridge 3 upstream of central passage 6 of filter head 4. The other end of core 2g is telescoped over stud 10 formed in the bottom 1a of outer shell 1. As shown in FIGS. 1 and 1g. an annular seal 14, for example an o-ring, is positioned between the internal base of removable center tube 2g and stud 10 attached to the bottom 1a of outer shell 1. The seal 14 prevents the passage of fluid and can share in the mounting of the tube 2 on the stud 10. The removable center tube 2 is, for example, a hollowed tubular element made of macromolecular plastic material, such as a polyamide. An embodiment of such a center tube is presented in the following in connection with FIG. 4.

Filtering cartridge 3 comprises a filtering element 11 and two annular end plates having aligned openings 13a and 12a, respectively, namely "head plate" 13 (called such because it is placed on the side of the head of filter 4) and outer shell plate 12 (called such because it is on the side of the bottom of outer shell 1). These two plates are glued or adhered to the ends of filtering element 11 and define its axial limits. The insertion of cartridge 3 in outer shell 1 consists of placing filtering element 11 around the center tube 2. The longitudinal form of the center tube 2g and its outer diameter closely adjacent to the inner diameter of filtering element 11 allows it to fulfill the function of maintaining the cartridge 3 in terms of inwardly directed pressure.

In the embodiment shown in FIG. 1, head plate 13 is limited in terms of movement between a shoulder 19 on filter head 4 and by the upper end. 24 of removable center tube 2g.

The cartridge 3 can be mounted in the outer shell with or without potential longitudinal play. In the example presented in detail in FIG. 1A, the cartridge is restrained in an axial direction by a rigid sleeve 113, integral with head plate 13, which abuts the upper open end 24 of center tube 2g and by an elastomeric sleeve 112 between sleeve 113 and shoulder 113a on head 4. The cartridge 3 is therefore limited in terms of longitudinal movement inside outer shell 1 by two forces 17, 18 from opposite directions exerted on head plate 13 through sleeve 113.

The cartridge 3 is mounted with a tight radial fit, at a first of its ends 114, around support end 115 of the removable center tube 2g, as shown in FIG. 1G. An O-ring 14, received in an inward facing groove in support end 115, seals against stud 10 and protrusion 117 around central passage 6 of filter head 4, until it would abut shoulder 113a. In this case, the inner wall of sleeve 113 is sized to abut and seal against protrusion 117. In contrast the arrangement in FIG. 1A2 is mounted to permit longitudinal play by the elimination of the elastomeric sleeve.

In further embodiments described below like parts and elements will be designated with the same number followed by a prime, e.g. 10'. In the second embodiment shown in FIG. 2, removable center tube 2' has annular shoulder 19. Upper plate 13' is limited in terms of longitudinal movement by shoulder 113' on filter head 4' and lower plate 12' is limited in terms of longitudinal movement by shoulder 19 of removable center tube 2'. As in the embodiment shown in FIG. 1, the cartridge 3' can be mounted in the outer shell 1' with or without potential play.

Figure 2:
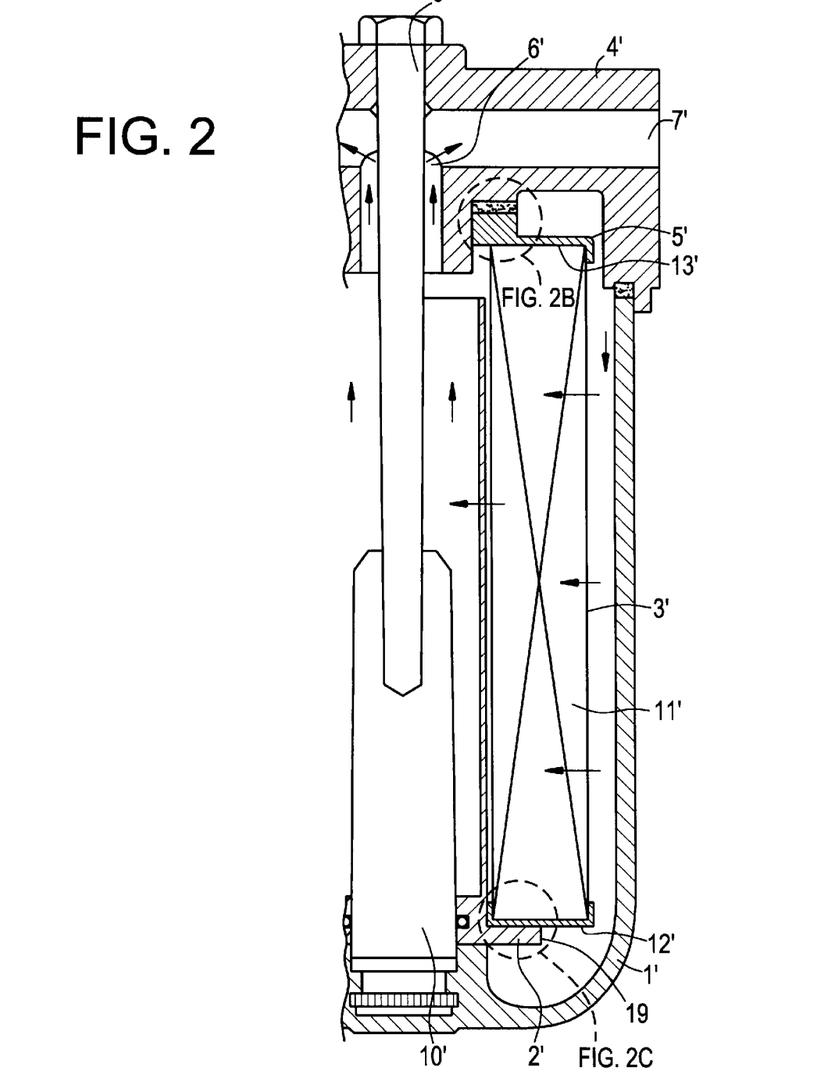
FIG. 2 shows a longitudinal section view of a second preferred embodiment of a fuel filter according to the present invention.
Figure 2B:
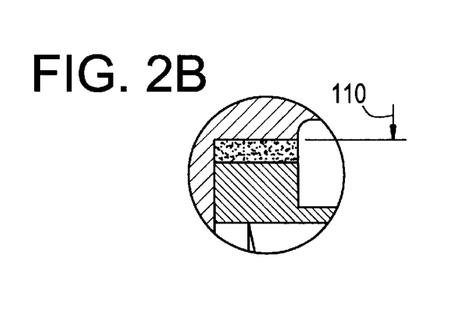
FIG. 2B shows an expanded view of the area B of FIG. 2.
Figure 2C:
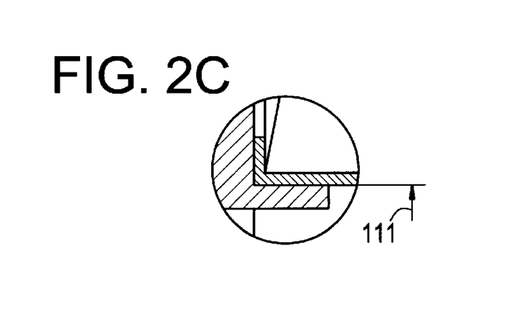
FIG. 2C shows an expanded view of the area C of FIG. 2.

In the example presented in detail in FIGS. 2B and 2C the cartridge is restrained from potential longitudinal play by shoulder 19 and by elastomeric sleeve 112' abutting shoulder 113'. The cartridge is therefore limited in terms of longitudinal movement inside outer shell 1' by two forces 110 and 111 from opposite directions exerted on head plate 13' and lower plate 12'.

Just as in the first embodiment, this second embodiment can be used with the cartridge mounted with potential longitudinal play. There is then no elastomeric sleeve, and the cartridge is free to have longitudinal play.

In the two embodiments shown in FIGS. 1 and 2, plates 12, and 13 are, for example, produced from macromolecular plastic material, such as polyurethane. The elasticity of the material then allows it to play the part of a seal, either at the peripheral edges of the plates (e.g. radial sealing) or at the external surface of the plate (e.g. axial sealing). Advantageously, the filtering element 11, for example, a paper or fabric—possibly gathered—is adhered to in the plastic material at the time of shaping of forming the end plates. It is thus possible to provide for production of the plates from two materials (that is to say with two different materials), namely, a carrier material capable of providing the desired axial or radial seal (polyurethane, . . . ), coated with a glue to solidly connect the filtering material ll(for example, polyamide, PVC), epoxy resin, etc. . . . ). Any other material or combination of materials can be selected by the pre-skilled in the art.

Once the removable center tube 2, or 2' is placed around stud 10 and cartridge 3 is placed around the removable center tube, the functioning of the filter according to the invention is identical to that of a known filter of the state of the art. The fluid to be filtered is introduced into annular chamber 5 of filter head 4 through the intake opening (not shown), flows along the internal wall of outer shell 1, and passes radially inward through filtering element 11. This filtering element 11 retains the particles in suspension in the fluid to be filtered. The fluid thus filtered passes through the opening or openings of removable center tube 2, or 2', rises along central passage 6 of filter head 4, and leaves filter head 4 through outlet opening 7.

Thus, the center tube can be disconnected from the filtering cartridge, as well as the outer shell and the filter head. In other words, the center tube can be removed and is independent. This allows one to reduce the cost of the filter since, on the one hand, the removable center tube can be reused, and on the other hand, the filtering cartridge is less complex.

Moreover, the quantity of material contained in the filtering cartridge, which cannot be incinerated, is reduced since the center tube is no longer part of the filtering cartridge. This allows the center tube to be manufactured from a material that cannot be incinerated, since the center tube no longer has to be incinerated with the filtering cartridge.

It should be noted that since, according to the invention, the removable center tube limits possible longitudinal movement of the filtering cartridge, the restraining of the filtering cartridge in the outer shell occurs independently from the dimensioning of the outer shell. It is then no longer dependent on the relative outer shell/filter head positioning, since henceforth one of the two stops limiting the longitudinal movement of the filtering cartridge in the outer shell is connected with the removable center tube.

It should also be noted that because it extends longitudinally inside the outer shell, the center tube allows for maintaining of the filtering cartridge in terms of inwardly directed pressure. In other words, the center tube allows one to prevent the filtering element from being compressed in the center under the pressure of the fluid to be filtered.

Figure 3:
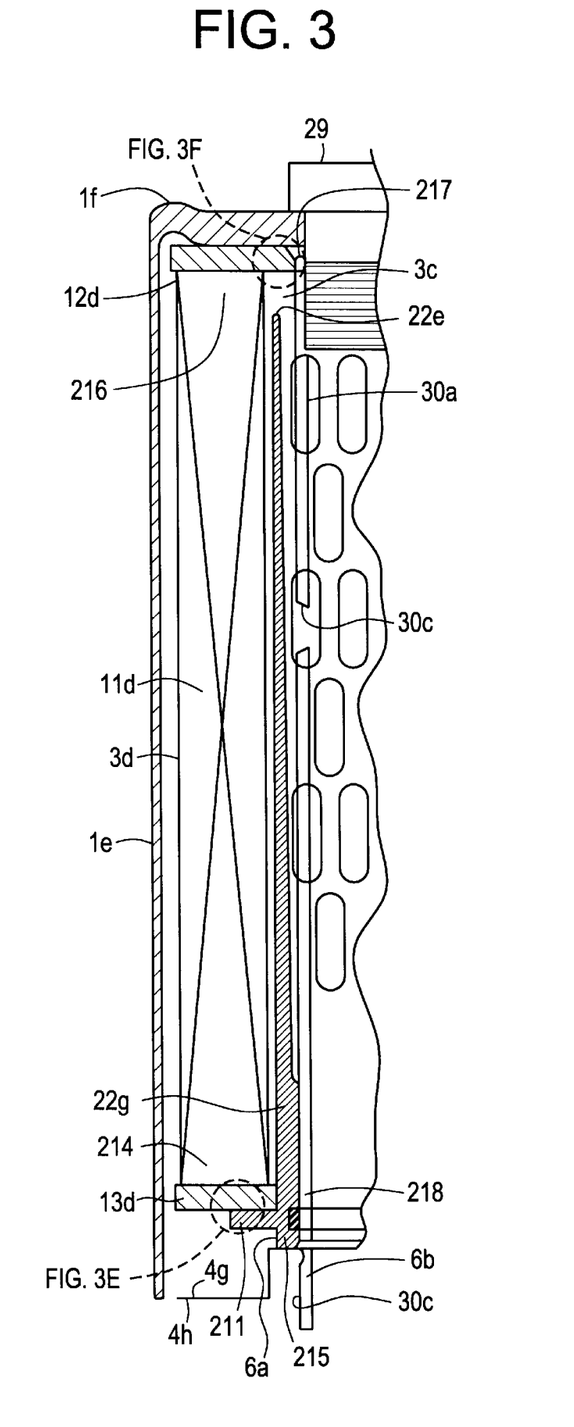
FIG. 3 shows a longitudinal section view of a first preferred embodiment of an oil filter according to the present invention.

FIG. 3 illustrates a longitudinal section of a first preferred embodiment of an oil filter according to the invention. The main difference between the embodiment of an oil filter and the two preceding embodiments of a fuel filter, is that the support stud for the removable center tube is no longer formed in the bottom of the outer shell but in the filter head which is permanently attached to the fluid system, e.g. the engine in the case of a diesel engine lubrication system.

In this embodiment of an oil filter a perforated removable center tube 22g comprises a free end 22e, that opens into a central chamber 3c of the cartridge 3d and a support end 215 that abuts a protrusion 4g formed in filter head 4h.

The means of attachment of outer shell 1e to filter head 4h comprise, a tube 30a having one end 30b adjacent end wall 1f of shell 1e and the other end 30c threaded into a threaded portion 6b of passage 6a and a screw 29 passing through in an opening 29a, in an end wall 1f of outer shell 1e, and threaded into the end 2 of tube 30a. Tube 30a has a plurality of openings 30c, only one of which is shown, for passage of oil to its interior.

Cartridge 3d comprises first and second annular end plates 12d, 13d and filter media 11d comprised of appropriate filtration material.

Figure 3E:
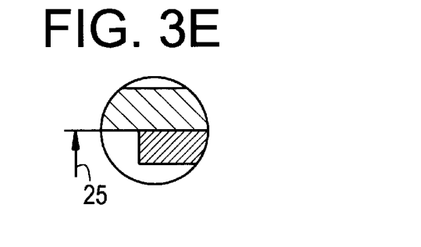
FIG. 3E shows an expanded view of the area E of FIG. 3.

In FIG. 3E, removable center tube 22g has shoulder 211. Plate 12d is limited in terms of longitudinal movement by the end wall 1f of outer shell 1e, by its upper surface and plate 13d is limited in terms of longitudinal movement by shoulder 211 of removable center tube 22g.

Figure 3F:
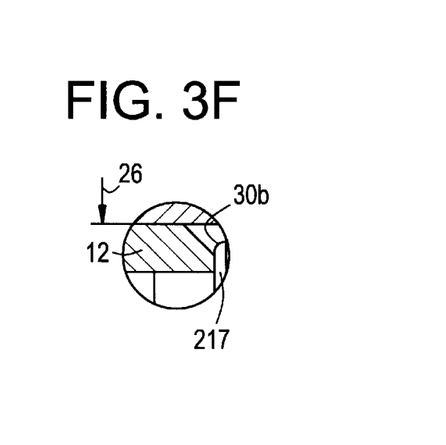
FIG. 3F shows an expanded view of the area F of FIG. 3.

Thus, as represented in detail in FIGS. 3E and 3F the cartridge 3d is limited in terms of longitudinal movement inside outer shell 1e by two forces 25, 26 from opposite directions exerted on plate 13d and plate 12d.

Figure 4:
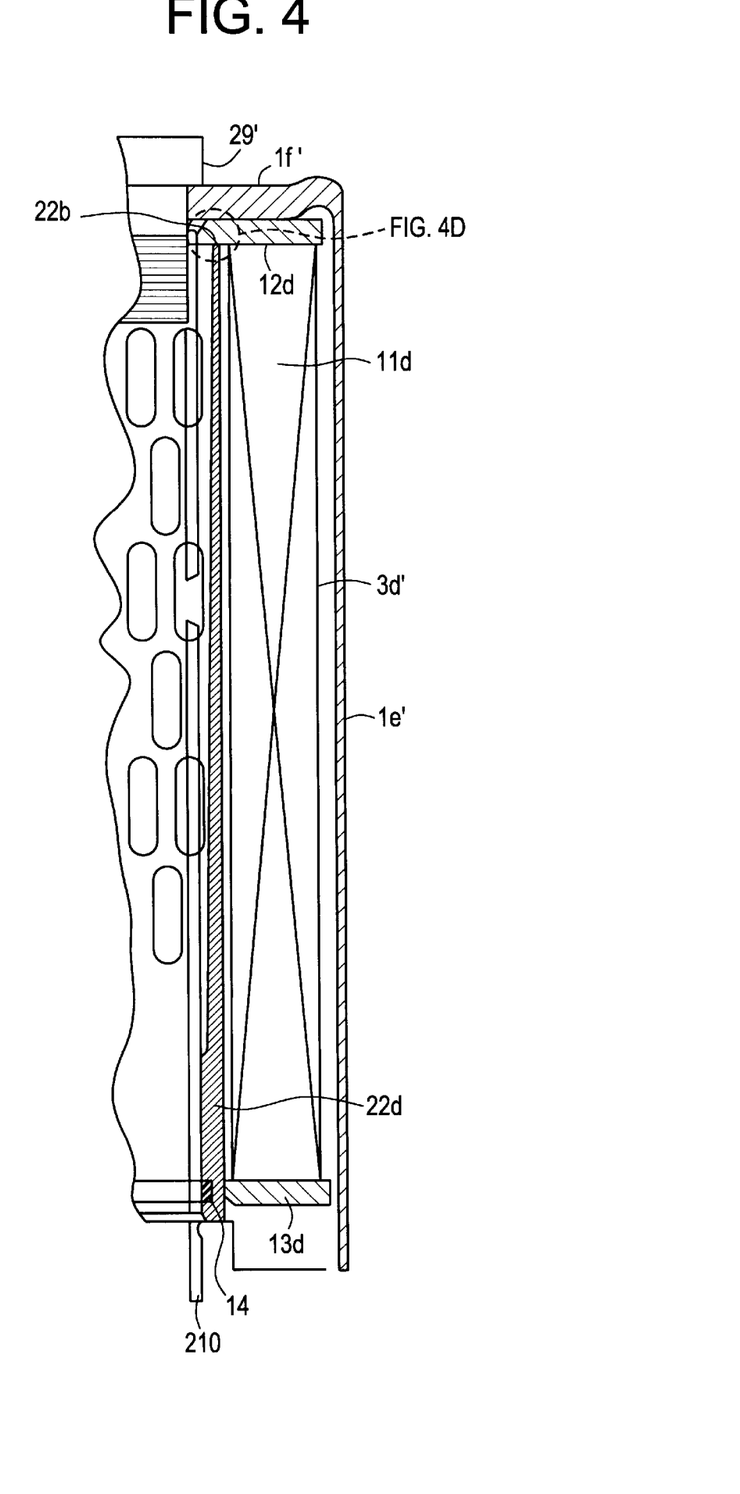
FIG. 4 shows a longitudinal section view of a second preferred embodiment of an oil filter according to the present invention.

Referring to FIG. 4, another center tube 22d is arranged so that plate 12d is limited in terms of longitudinal movement between, the end wall 1f of outer shell 1e', and the upper end 22b of removable center tube 22d.

Figure 4D:
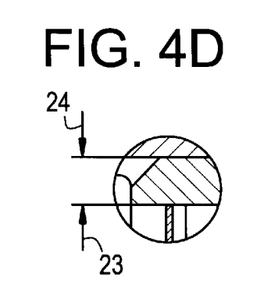
FIG. 4D shows an expanded view of the area D of FIG. 4.

In the example presented in detail in FIG. 4D, the cartridge 3d' is limited in terms of longitudinal movement inside outer shell 1e' by two forces 23, 24 from opposite directions exerted on plate 12d'. However, it is clear that as in the embodiments of the fuel filter, the cartridge 3d or 3d', can be mounted in the outer shell with or without longitudinal play.

In both of these embodiments of an oil filter, the axial seal occurs due to a radial adjustment of the cartridge around different elements. Thus, in the first embodiment the cartridge 3d, is mounted with a tight radial fit, at a first of its ends 214, around support end 215 of the removable center tube 22g and at a second of its ends 216, around end 217 of tube 30a adjacent end wall 1f outer shell 1e. Support end 215 of the removable center tube 22g and is mounted with a tight radial fit around end 218 of tube 3a adjacent of head 4h.

Figure 5:
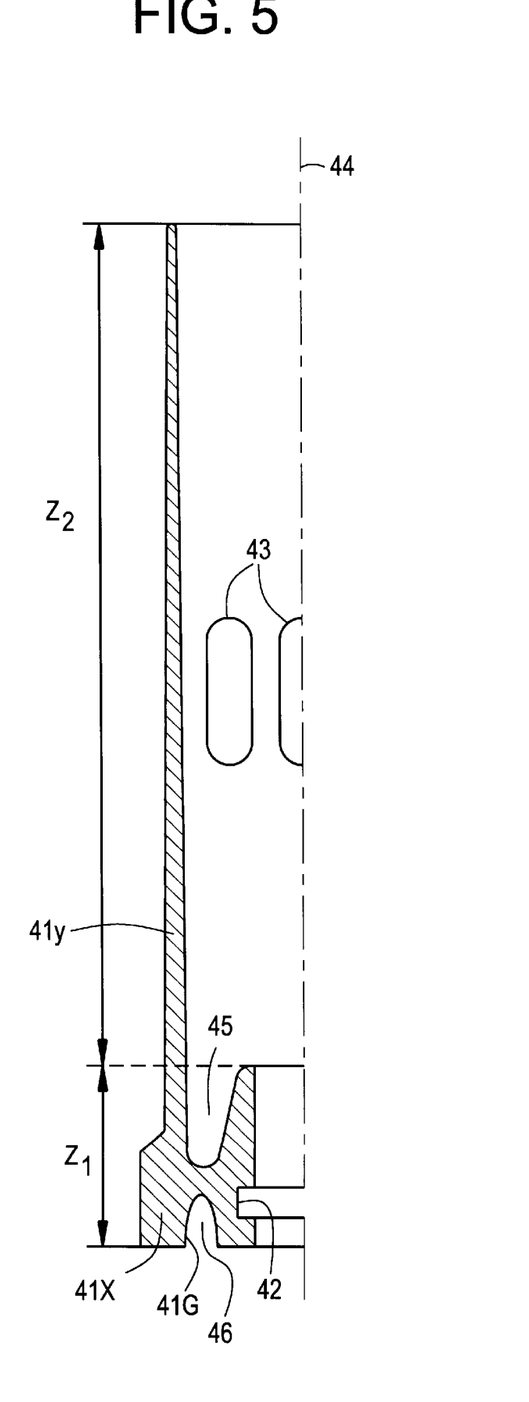
FIG. 5 shows a longitudinal section view of an embodiment of a removable center tube that is part of a filter as presented in FIG. 1.

FIG. 5 shows a longitudinal cross section of a removable center tube that can be used with the embodiments shown in FIGS. 1 and 4. Removable center tube 41g, is a hollowed tube and has two portions $Z_1$, $Z_2$ with distinct internal diameters. Lower portion $Z_1$, has a first internal diameter that allows the center tube 41g to be pressed over the external diameter of the protrusion or stud serving for support of this center tube. Upper portion $Z_2$, has a second internal diameter that is substantially larger than the external diameter of the support stud. For reasons of ease of removal from the mold, the second diameter is not constant but decreases slightly as a function of the distance with respect to the upper part.

The length of upper portion $Z_2$ must be sufficient so that once it is placed in the outer shell, the center tube extends longitudinally over at least a substantial part (that is to say over a sufficiently large part) of the length of the outer shell.

Removable center tube 41g, also has an annular inwardly facing sealing recess 42 which receives a suitable seal ring.

The removable center tube has a plurality of openings 43 extending according to longitudinal axis 44 of the center tube and inside upper portion $Z_2$ of this center tube. Lower portion $Z_1$ also has upper and lower annular recesses 45 and 46 to minimize the volume of material.

The removable center tube 41g in FIG. 5 corresponds to the case in which the upper end of the center tube stops against a plate of the filter cartridge.

The removable center tube 41g in this example has an annular bearing surface 41x whose diameter is greater than bearing surface 41y in order to facilitate mounting and removal of the filter cartridge. Furthermore, the tightening of the center tube 41g on the stud or protrusion is advantageously greater than the tightening of the filter cartridge on the center tube 41g in order to facilitate removal of the filter cartridge.

Figure 6:
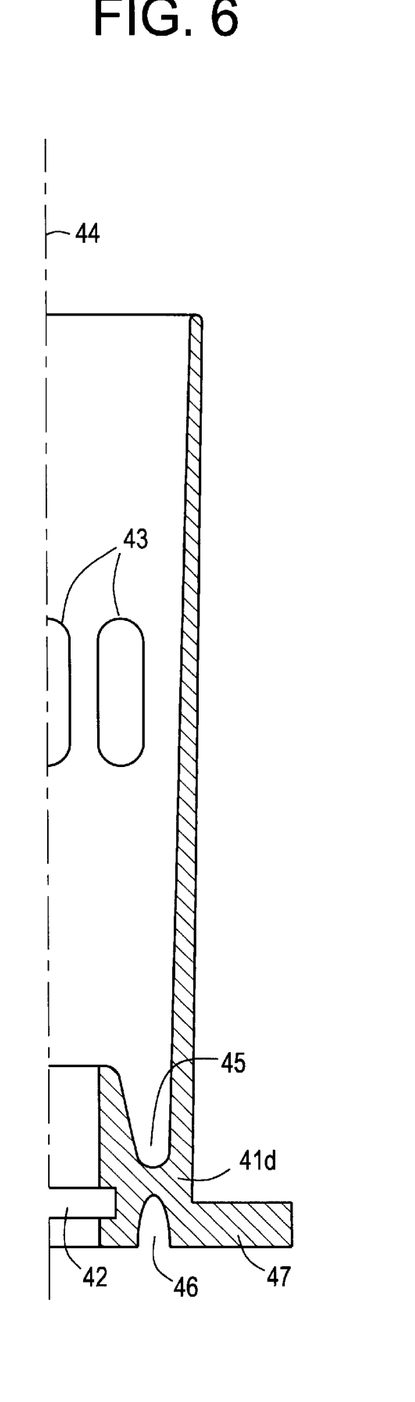
FIG. 6 shows a longitudinal section view of an embodiment of a removable center tube that is part of a filter as presented in FIG. 2.

FIG. 6 shows the second embodiment of removable center tube 41d for the situation in which the end of center tubes 41d adjacent the base has a shoulder 47 serving as a support for a plate of the filter cartridge.

In this embodiment the over all length of the center tube 41d is substantially less than the overall length of the of the center tube 41g and it is substantially less than the overall length of the filter cartridge.

Figure 7:
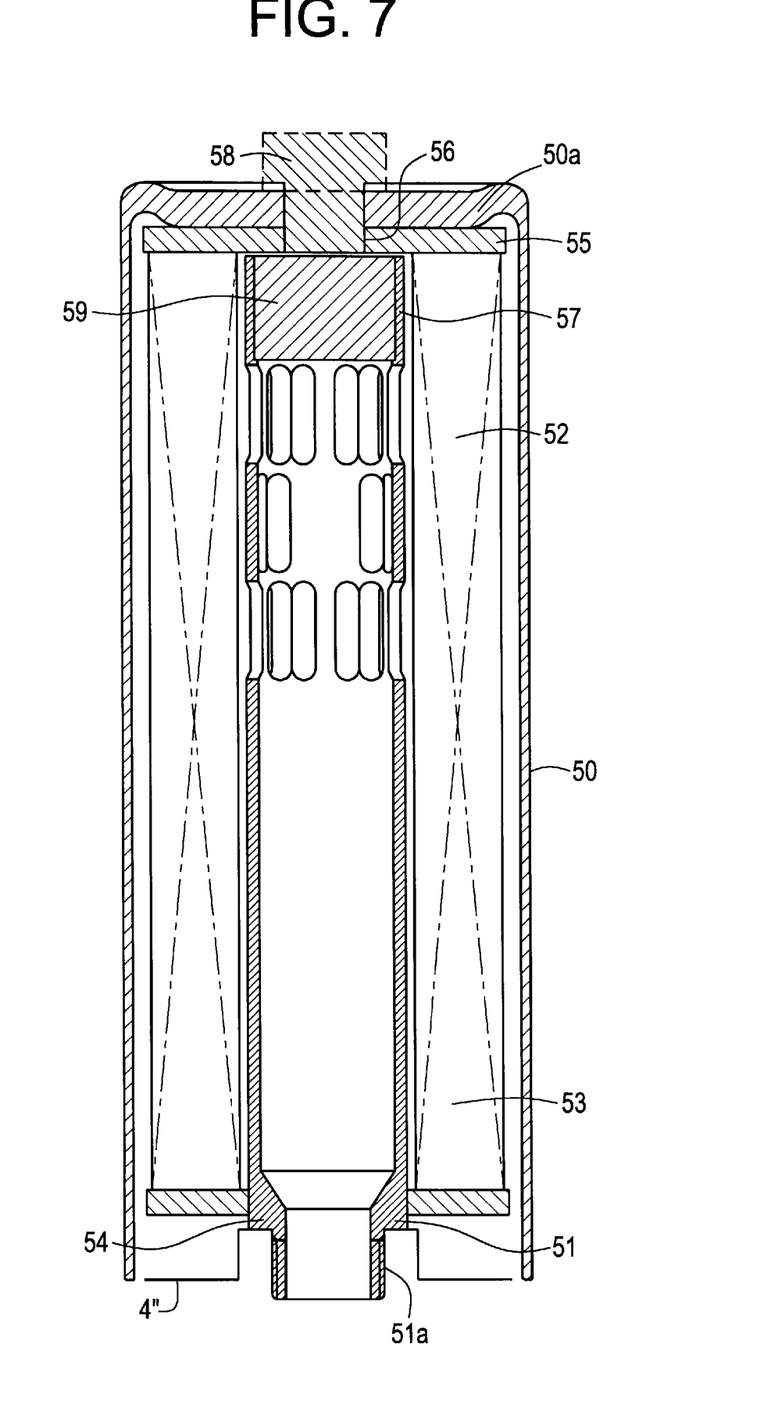
FIG. 7 shows a longitudinal section view of another preferred embodiment of an oil filter according to the present invention.

FIG. 7 presents a longitudinal section of still another preferred embodiment of an oil filter according to the present invention. This embodiment is characterized by the fact that the stud and the removable center tube are combined into a single element 51. In this embodiment, the seal is achieved by a radial fit at the end of cartridge 52 abutting end wall 50, of outer shell 50. The internal wall of hole 56 of plate 55 is pressed against the annular fastening element 58. Fastening element 58 (forming a threaded or rapid connection with annular element 59, which is permanently connected with element 51 by adhesion. A tight radial adjustment at lower end 53 of the filtering cartridge, around end 54 of element 51 located on the side of head 4" provides the other seal around the lower end of the element 51. End 54 of element 51 has a threaded spigot section 51a threaded into base 4".

This embodiment still has all the advantages connected with the other embodiments presented in connection with FIG. 2, since the restraining of the filtering cartridge occurs due to a wall 57 of the element 51.

Having thus described the invention, what is claimed as novel and desired to be secured by Letters Patent of the United States is:

1. A fluid filtration assembly comprising:
   a head through which fluid to be filtered is circulated, said head having an outlet passage coaxially surrounding a central axis;
   an annular outer shell coaxially surrounding said central axis and having an integral closed end and an open end;
   first means for removably connecting the open end of said outer shell to said head;
   a perforated center tube coaxially surrounding said central axis and having opposite first and second ends positioned between said head and the closed end of said outer shell and having its interior connected to said outlet passage when said outer shell is connected to said head;
   a filtering cartridge received in said shell, said cartridge having first and second annular end plates secured to first and second ends of an annular filtration medium, respectively, said first and second annular end plates each having an inner diameter, an annular imperforate portion of said first end plate being sandwiched between an axial abutment surface defined at the first end of said perforated center tube and an axial abutment surface on one of said head and an interior of the closed end of outer shell, said second end plate having an opening through which said perforated tube extends;
   second means extending into the second end of said perforated center tube for removably connecting the said second end of said perforated center tube to one of said head and said outer shell, wherein said second means sealably closes the second end of said perforated center tube;
   an axial abutment surface on one of said head and said outer shell for axially abutting against an axial abutment surface on the second end of said perforated center tube;
   said filtering cartridge being removable from said perforated center tube when said outer shell is disconnected from said head, whereby only the filtering cartridge is replaced.

2. A fluid filter as in claim 1, wherein:
   said first end plate has a circular opening smaller in diameter that an outer diameter of said center tube;
   wherein the first end of said center tube is adjacent said integral closed end of said outer shell the second end of said center tube is substantially adjacent said first end plate to limit its axial movement away from said head.

3. A fluid filter as in claim 2 further comprising an annular elastomeric element between the head and said first end plate.

4. A fluid filter as in claim 2 wherein said second means for removably connecting comprises an annular stud extending axially partially through the interior of said outer shell from said integral closed end, said second end of said center tube being sealingly telescoped over said stud, and means between said annular stud and the interior of said center tube for forming a seal therebetween.

5. A fluid filter as in claim 4 further comprising a central annular protrusion on said head, said first end plate of said filtering cartridge being telescoped over the annular protrusion, and means between said annular protrusion and said first end plate for forming a radial seal therebetween.

6. A fluid filter as in claim 5 further comprising a removable fastening element extendible through the head and fastenable to said stud for removably mounting said fluid filter.

7. A fluid filter as in claim 1 wherein:
   said center tube has a flange adjacent its second end for abutting an axially outer face of said second end plate for limiting axial movement of said filtering cartridge away from said head.

8. A fluid filter as in claim 7 further comprising an elastomeric element between the head and said first end plate.

9. A fluid filter as in claim 1 wherein said center tube has an outer diameter closely adjacent the inner diameter of said annular filtration medium thereby supporting said annular filtration medium against inwardly directed fluid pressure.

10. A fluid filter as in claim 1 wherein said filter is removably connected to a head through which fluid to be filtered is circulated and wherein:
    said outer shell is removably connected to the head;
    said first end plate abuts the closed end of said outer shell;
    said center tube restricts axial movement of said filtering cartridge away from said closed end of said outer shell.

11. A fluid filter as in claim 10 wherein:
    said first end plate has an opening smaller in diameter than an outer diameter of said center tube;
    wherein the second end of said center tube is adjacent said head and said first end of said centertube abuts an axially inner face of said first end plate to limit its axial movement away from the closed end of said outer shell.

12. A fluid filter as in claim 10 further comprising: a central perforated support tube over which said center tube is telescoped, said support tube having one end removably connectable with the head; and
    a means for removably connecting the other end of said support tube to the closed end of said outer shell.

13. A fluid filter as in claim 12 wherein:
    said removable connecting means for said support tube comprises a screw sealingly extending through the closed end of said outer shell and threadedly engaging the other end of said support tube.

14. A fluid filter as in claim 10 wherein:
    wherein the second end of said center tube is adjacent the head and a the first end of said centertube terminates between said first and second end plates, said center tube having a flange adjacent its second end for abutting an axially outer face of said second end plate for limiting axial movement of said filtering cartridge away from the closed end of said outer shell.

15. A fluid filter as in claim 14 further comprising:
    a central perforated support tube over which said center tube is telescoped said support tube having one end removably connectable with the head; and
    a means for removably connecting the other end of said support tube to the closed end of said outer shell.

16. A fluid filter as in claim 15 wherein said removable connecting means for said support tube comprises a screw sealingly extending through the closed end of said outer shell and threadedly engaging the other end of said support tube.

17. A fluid filter as in claim 1 wherein said filter is removably connected to a head through which fluid to be filtered is circulated and wherein:

said outer shell is removably connected to the head;

said first end plate abuts the closed end of said outer shell and has an opening smaller in diameter than an outer diameter of said center tube;

wherein the second end of said center tube is removably connectable to said head and the first end of said center tube abuts an inner wall of said first end plate; and said second means connects said center tube to the closed end of said outer shell.

18. A fluid filter as in claim 17 wherein said center tube connecting means comprises;

an element mounted in the second end of said center tube; and, a screw sealingly extending through the closed end of said outer shell and threadedly engaging the element in said center tube.

* * * * *